May 28, 1963 W. W. KLEMME 3,091,325
CONVEYOR CHAIN ATTACHMENT
Filed March 30, 1962 2 Sheets-Sheet 1

United States Patent Office 3,091,325
Patented May 28, 1963

3,091,325
CONVEYOR CHAIN ATTACHMENT
William W. Klemme, Dallas, Tex., assignor to Chain Belt Company, Milwaukee, Wis., a corporation of Wisconsin
Filed Mar. 30, 1962, Ser. No. 183,799
4 Claims. (Cl. 198—174)

This invention relates to conveyor chain and particularly to the type which moves in a trough to push bulk material along in the trough. A similar type of chain is also used to carry logs in a trough wherein the logs rest lengthwise on the chain which is supported by wearing shoes attached at intervals to the underside of the chain. Such shoes must be readily replaceable because of the high rate of wear due to friction between the shoes and the bottom of the trough. However, their securement to the chain as by means of bolts or pins has been less than satisfactory because the heads of such bolts or pins are also subject to wearing with the shoe and will become loose. Any loose piece of metal carried with the logs to the saw has, of course, very serious consequences.

The present invention provides a wearing shoe with attachment to the chain in a manner which is readily accomplished but includes no loose parts or bolts. The shoe comprises a hollow, cast-iron, rectangular block having a central, rectangular top opening dimensioned to allow the oppositely projecting lugs of the chain to be assembled therein. The lugs referred to are permanently welded to the side-bars of the pin link of the chain and the assembly referred to is accomplished merely by first disassembling the link. Similarly, the shoes cannot be or become removed from the chain without disassembly of the link. Such an unplanned event would, of course, be immediately noticed.

The drawings furnished herewith illustrate the best mode of carrying out the invention as presently contemplated and set forth hereinafter. In the drawings.

Figure 1:
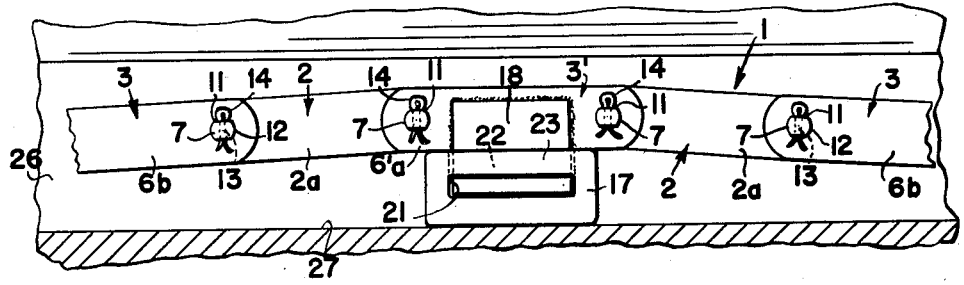
FIGURE 1 is a side elevation of a section of the chain as supported over the shoe in the trough.
Figure 2:
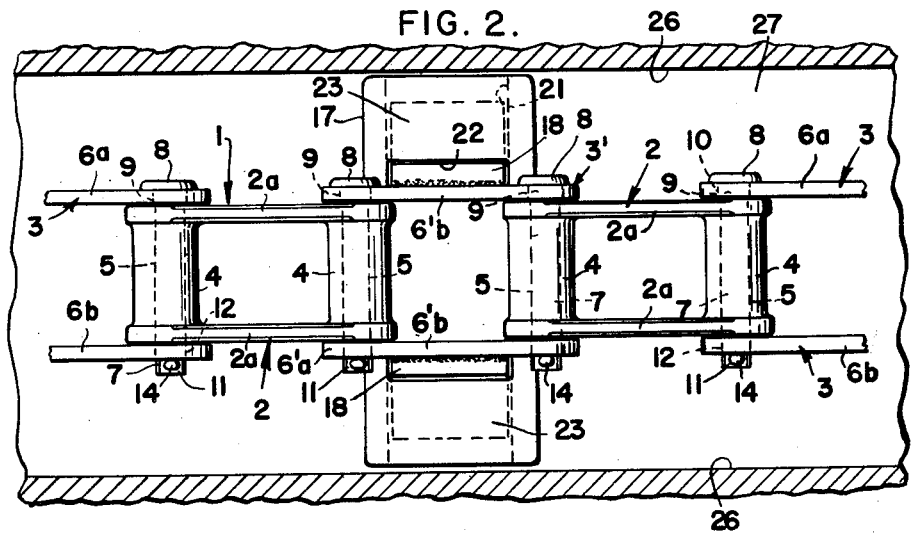
FIG. 2 is a plan or top view of the section of chain and shoe shown in FIGURE 1.
Figure 3:
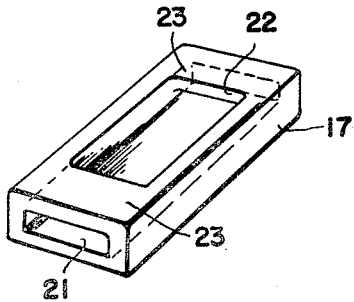
FIG. 3 is a perspective view of the shoe.
Figure 4:
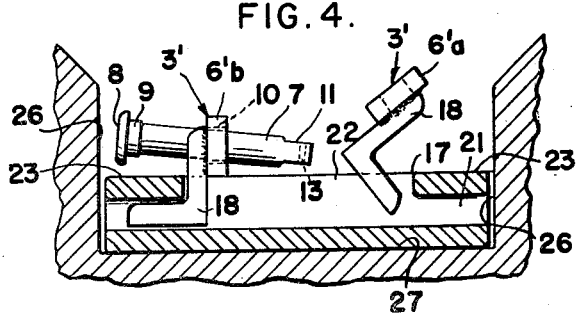
FIG. 4 shows the shoe in section and the manner of inserting the lugs of the pin link in the shoe.

The chain 1 shown in FIGS 1–4 includes the bushing links 2 and pin links 3. Each link 2 includes the parallel, spaced side bars 2a and the spaced barrels 4 having axial bores 5. Each link 2 is of unitary, cast construction but may be of the equally conventional construction comprising assembled bushings and plates, not shown.

Each link 3 comprises the parallel, spaced side bars 6a and 6b and the pins 7 having heads 8.

The short section 9 of pin 7 immediate to head 8 fits tightly in the corresponding hole 10 of bar 6a and is slightly larger than the remaining length of the pin to facilitate insertion and removal of the pin. The end of pin 7 opposite head 8 is provided with the upper and lower flat sections 11 and fits the corresponding hole 12 of bar 6b so that the pin is secured thereby against rotation in bars 6a and 6b. The hole 13 in the end of pin 7 is provided for the cotter pin 14 which, with head 8, secures the bars on the pin.

The attachment link 3' is similar to link 3 except that the link 3' includes the shoe 17 disposed beneath the link and the lugs 18 welded to bars 6a and 6b. Each lug 18 extends downwardly from link 3' a short distance and outwardly or away from the center-line of the chain. The width and length of each lug is very approximately about one-half the width of the chain and should, of course, have a sturdy construction comparable to that of the chain. The lugs may be formed integrally with bars 6a and 6b as is very customary in chain construction. However, the simple corner welding required for the construction shown is found more economical for large chain of six-inch and greater pitch (distance between holes).

Each shoe 17 is a rectangular block having a central rectangular core 21 extending from end to end and having an upper rectangular opening 22. The shoe may be also described as being of U-section with the webs 23 at the opposite ends of the block defining the opening 22 therebetween. Shoes 17 are very readily and economically cast in sand molds because of their simple form and the uniform wall thickness which is presented and each shoe 17 may therefore be of any weight depending upon the service which the shoe is to provide.

Shoe 17 is fitted on the lugs 18 of link 3' by removing pins 7 of the link so that each lug 18 may be separately inserted in core 21 and positioned beneath the corresponding web 23. With each link 2 in position between side bars 6'a and 6'b, pins 7 may then be inserted to complete link.

Shoe 17 should be long enough to fit readily between the two sides 26 of the trough shown in part in the drawings and the chain includes a link 3' and a shoe 17 at regular intervals for the support of the chain on the bottom 27 of the trough. As the bottom side of the shoes wear away they remain nonetheless securely attached to the chain. Normally, replacement with new shoes should be made before the lower face of the shoes on the chain is worn away to the center core. However if that occurs, and some damage to the link may result, the remaining parts of the shoe which fit over lugs 18 and extend under the link still cannot become loose from the link.

The present invention thus provides a securement of the shoe to the link which is practically permanent except that the shoe is readily removable upon disassembly of the link. Where ease of replacement of sections of chain requires certain links to be readily disassembled to open the chain, the present invention provides equal ease of replacement of the shoes.

Figure 5:
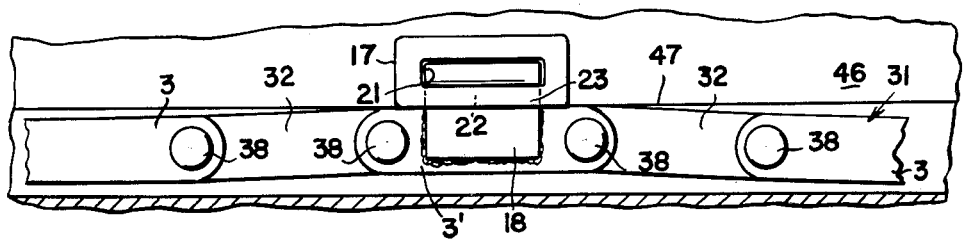
FIG. 5 is a side elevation of a section of the chain as supported beneath the shoe.
Figure 6:
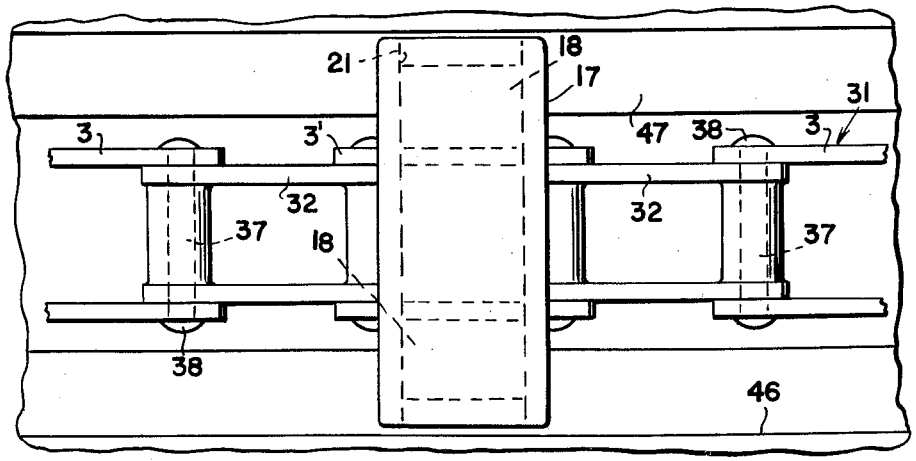
FIG. 6 is a plan or top view of the section of chain and shoe shown in FIG. 5.
Figure 7:
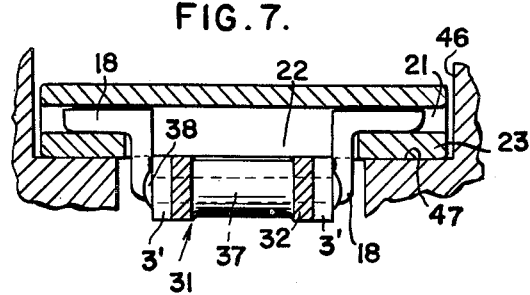
FIG. 7 is a cross-section of the chain and shoe shown in FIGS. 5 and 6.

As shown in FIGS. 5–7 of the drawings, shoes 17 may also be used with the riveted chain 31 having bushing links 32 of a construction similar to the pin links 3 and 3'. The pins 37 are headed as at 38 and provide a chain construction which would be preferred where changing of shoes 17 would be less frequent.

The shoes 17 are also equally adapted to slide in trough 46 on the spaced tracks 47 with chain 31 therebetween and beneath the shoes. Webs 23 sliding on tracks 47 may be of slightly greater section if desired and the ends of the shoes engaging either side of trough 46 should limit any sideward movement of the chain.

Various modes of carrying out the invention are contemplated as within the scope of the following claims particularly pointing out and distinctly claiming the subject matter which is regarded as the invention.

I claim:

1. In a conveyor chain comprising a series of bushing links and pin links, each pin link comprising a pair of spaced side bars having holes in opposite ends thereof and pins extending through said holes, each pin having means at each end thereof and removable at least at one end thereof for assembling and securing said bars on the pins with the corresponding ends of the adjacent bushing links turnable on the pins between said bars, each bar having a centrally disposed lug extending laterally away from the chain in a plane beneath the pin link, and a hollow, cast wearing shoe having a lower rectangular wearing face and a smaller rectangular central upper opening, said opening and the ends of said shoe being dimensioned to receive said lugs of said side bars individually and prior to their assembly on said pins and being removable from the pin link only upon disassembly of the link by removal of the pins of the link.

2. In a conveyor chain including pin links having spaced parallel side bars and pins connecting said bars and readily removable for disassembly of the respective link, a hollow cast shoe extending cross-wise of and beneath the link and having a central, rectangular upper opening, said bars having lugs extending downwardly into said opening and oppositely toward the respective ends of the shoe whereby said shoe and link comprise a permanent assembly except upon disassembly of the link by removal of the pins connecting the bars of the link.

3. In a conveyor chain, a pin link having spaced parallel side bars, said bars having holes in corresponding ends, pins fitting in the corresponding holes and connecting said bars and being readily removable for disassembly of the link, a rectangular, hollow shoe extending cross-wise of and beneath the link and having a central, rectangular upper opening, said bars having lugs extending downwardly into said opening and oppositely toward the respective ends of the shoe whereby said shoe and link comprise a permanent assembly except upon disassembly of the link by removal of the pins connecting the bars of the link.

4. An attachment and attachment link for a conveyor chain, said attachment having a hollow body and a rectangular opening, said chain including alternate bushing links, said attachment link being disposed between two bushing links and including parallel bars which are laterally spaced with said bushing links disposed therebetween, said bars having corresponding holes at each end thereof, pins fitting said corresponding holes and extending through corresponding bush links, said attachment extending cross-wise of said attachment link and having a central, rectangular opening, and lugs fixed to said bars and extending therefrom and through said opening of the attachment and having ends extending in opposite directions to secure said attachment to said attachment link while said link remains assembled between said bushing links.

No references cited.